United States Patent Office 3,584,059
Patented June 8, 1971

3,584,059
PURIFYING ORGANIC PEROXIDES
Frederick G. Schappell, North Star, Newark, Del., assignor to Hercules Incorporated, Wilmington, Del.
No Drawing. Filed Dec. 19, 1968, Ser. No. 785,345
Int. Cl. C07c 73/00
U.S. Cl. 260—610A 7 Claims

ABSTRACT OF THE DISCLOSURE

It has been found that bis(tert.-alkylperoxyisopropyl) benzene compounds, useful as cross-linking agents for various polymers, can be heat treated at a temperature of from about 90° C. to about 120° C. so as to decompose monoperoxide by-product contaminates without significantly altering the bisperoxide.

This invention relates to a process of purifying peroxides. More particularly, this invention relates to a heat treatment process for the purification of bis(tert.-alkyl-peroxyisopropyl)benzene compounds.

The bis(tert.-alkylperoxyisopropyl) benzene compounds are excellent cross-linking agents for various polymers, exhibiting a cross-linking effectiveness of up to twice that of some commercial cross-linkers, while imparting less residual odor to the cross-linked product. Unfortunately, the known method for the synthesis of these bisperoxides results in formation of from about 3% to about 8% of monoperoxide by-product. This by-product or contaminate has been identified as an isopropenyl-α-tert.-alkyl-peroxyisopropyl benzene, having a lower thermal stability than the bisperoxide. Hence, the bisperoxide which is contaminated with the by-product is not of uniform thermal stability. Such a composition might easily cause premature curing under storage at elevated temperatures or during compounding, curing or extruding.

It has now been found that bis(tert.-alkylperoxyisopropyl) benzene compounds contaminated with monoperoxide by-product can be heat treated so as to decompose the monoperoxide without significantly altering the bisperoxide. This is quite unexpected, since peroxides are known to be unstable when heated and it would have been expected that the bisperoxide would also be decomposed. Accordingly, the process of this invention comprises heating a bis(tert.-alkylperoxyisopropyl) benzene contaminated with isopropenyl-α-tert.-alkylperoxyisopropyl benzene at a temperature of from about 90° C. to about 120° C.

Any desired procedure can be used for heat treating the impure bisperoxide in accordance with the process of this invention, including both batch and continuous or flow-type procedures. As stated above, the process will be conducted at a temperature of from about 90° C. to about 120° C. until the monoperoxide has been decomposed. The amount of time required to purify the impure peroxide will depend primarily upon the temperature of the heat treatment. Thus, in a continuous or flow-type process the purification can be completed in a matter of minutes at temperatures of from about 108° C. to about 120° C., while several hours are required for batch operations at temperatures of from about 95° C. to about 107° C. The specific time required for any specific set of circumstances can easily be determined by taking samples and determining the amount of monoperoxide remaining.

The heat treatment can be conducted while the crude bisperoxide is dissolved in an inert solvent or in the absence of a solvent. Any inert solvent can be used as long as the proper temperature can be maintained. Exemplary inert solvents are hexane, heptane, octane, methyl-cyclohexane, benzene, toluene and the like. If desired, the solution of the crude bisperoxide need not be separated from the original solvent in which it was prepared. One need only remove the acid-acting catalyst used in the preparation of the bisperoxide before proceeding to heat the solution. Either reduced or superatmospheric pressure can be used to achieve the correct temperature. For example, the use of reduced pressure to control the boiling point of the system offers a convenient means of controlling the temperature. Where the heat treatment is conducted in the absence of a solvent the removal of decomposition impurities from the monoperoxide is facilitated by operation at reduced pressure.

The bisperoxides purified in accordance with this invention are produced by the following steps:

(1) Oxidation of a bisisopropyl benzene compound capable of oxidation to a hydroperoxide, by contacting with elementary oxygen until the two hydroperoxide groups are formed;

(2) Reduction of the hydroperoxy compound to the corresponding hydroxy compound; and (3) Reaction of the bis(hydroxy isopropyl) benzene compound with a chemically equivalent quantity of tert.-alkyl hydroperoxide until an organic peroxide having 2-tert.-alkyl peroxyisopropyl groups attached to the benzene group is produced.

The first step of the process, namely the oxidation of the isopropyl benzene compound to produce a hydroperoxide is well known in the art as exemplified by U.S. Pats. 2,438,125; 2,547,938; 2,548,435; 2,632,774; 2,664,-447; and 2,856,433. In the second step the hydroperoxides formed in the oxidation are reduced either by reaction with metal sulfides, by reaction with hydrogen and a catalyst, electrolytically by an electric current, by thermal decomposition in the presence of alkalies, or by giving up oxygen to a receptive hydrocarbon in the presence of heavy metal catalysts, sodium alkoxides or sodium hydroxides. The third or last step can be carried out by heating the reactants with an acid-acting condensation catalyst at a temperature of from about 20° C. to about 70° C. in a volatile organic solvent at reflux while azeotropically distilling off the water liberated in the reaction.

The tertiary alkyl groups introduced by the tertiary alkyl hydroperoxides are exemplified by the following: tertiary butyl, tertiary amyl, tertiary hexyl, tertiary heptyl, tertiary octyl, tertiary nonyl, tertiary decyl, tertiary cyclohexyl (1-methyl cyclohexyl), p-menthanyl, and pinanyl. In each case a tertiary alkyl hydroperoxide is reacted with the bis(hydroxyisopropyl) benzene compound to produce the bis(tert.-alkylperoxyisopropyl) benzene compound purified in accordance with this invention.

The acid-acting condensation catalyst used in the peroxide condensation step of the process can be any of the well known acid-acting condensation catalysts such as a friedel-crafts type catalyst including $BF_3$; ether complexes of $BF_3$; organic acid complexes of $BF_3$; halides of metals whose hydroxides are amphoteric such as $AlCl_3$, $ZnCl_2$, $SnCl_4$ and $TiCl_4$; mineral acid condensation catalysts such as HF, $HBF_4$, $H_2SO_4$, and $H_3PO_4$; organic sulfonic acids; organic acid sulfates; and aromatic sulfonic acids, including benzene, toluene and naphthylene sulfonic acids. A catalyst such as an organic sulfonic acid, which is soluble in the solvent vehicle, is preferred.

This acid-acting catalyst must be removed before the heat treatment of the instant invention can be started. The reason being that the bisperoxide is unstable when heated in the presence of the acid-acting catalyst and may itself decompose to form monoperoxide contaminate. Thus, following the above described preparation of the bis(tert.-alkylperoxyisopropyl) benzene compound the acid-acting catalyst will be removed. This can readily be accomplished by washing the reaction mixture with an aqueous solution of an alkali metal hydroxide such as sodium hydroxide. After rinsing with water to remove any residual alkali there remains a solution of the bisperoxide contaminated with monoperoxide.

The following examples will serve to illustrate the purification process of this invention. All parts and percentages are by weight unless otherwise stated.

EXAMPLE 1

This example illustrates the purification of a mixture of $\alpha,\alpha'$-bis(tert.-butylperoxy)-meta- and para-diisopropyl benzene in the absence of a solvent.

The crude sample of mixed bisperoxides contains 6.8% of isopropenyl-$\alpha$-tert.-butylperoxy isopropyl benzene and was prepared by reacting tert.-butyl hydroperoxides with meta- and para-bis(hydroxyisopropyl) benzene in a benzene solvent in the presence of p-toluene sulfonic acid. The acid catalyst is removed by washing with aqueous sodium hydroxide and the bisperoxide isolated by distilling off the benzene under reduced pressure.

Into a vessel equipped with a stirrer and fitted with an electric heating mantle and a Dry Ice-acetone cooled condenser is placed 500 parts of the crude mixed bisperoxides. The material is heated to 100° C. under a reduced pressure of approximately 27 mm. of mercury. After the bisperoxides melt (at about 50° C.) stirring is begun and continued throughout the process. When the temperature reaches 100° C. tert.-butylalcohol and acetone are detected in the condensate indicating that decomposition of the monoperoxide has begun. Samples taken during the process indicate that there is a regular decrease in the concentration of isopropenyl-$\alpha$-tert.-butylperoxyisopropyl benzene. After heat treating 6¼ hours the monoperoxide has essentially disappeared, while the amount of mixed bisperoxides present is the same as it was in the crude material.

EXAMPLE 2

This example illustrates the purification of the mixed bisperoxides described in Example 1 in an inert solvent.

To a vessel equipped with a stirrer and fitted with a reflux condenser is added 400 parts of crude bisperoxides dissolved in 376 parts of heptane. The solution is heated while stirring to a temperature of 100° C. under normal atmospheric pressure. Samples are periodically withdrawn and tested for monoperoxide content. After 6.08 hours the monoperoxide content is 0.05%. The purified bisperoxides are recovered by stripping the heptane under reduced pressure at a temperature below 100° C. The amount of purified bisperoxides recovered is exactly the same as the amount of bisperoxides in the crude material treated.

EXAMPLE 3

This example illustrates the purification of the mixed bisperoxides described in Example 1 in an inert solvent.

To 200 parts of boiling heptane is added 212 parts of the crude bisperoxides. The resulting solution is then heated to its reflux temperature (107° C.) while stirring. Sufficient heat is supplied to keep the solution refluxing. As time passes the reflux temperature gradually decreases to 102° C. due to the formation of low boiling materials such as acetone and tert.-butylalcohol. The refluxing solution is sampled periodically as described in Example 2. After 2 hours only a trace of monoperoxide is detected and after 3 hours the monoperoxide has completely disappeared. Purified bisperoxides are recovered by stripping the heptane under reduced pressure at a temperature below 100° C. Na appreciable loss of bisperoxides is noted.

The above process is repeated using a sample of the mixed bisperoxides from which the acid-acting catalyst has not been removed. To 100 parts of boiling heptane is added 100 parts of the crude bisperoxides containing approximately 0.3 part p-toluenesulfonic acid. The resulting solution is then heated to its reflux temperature exactly as described above. The refluxing solution is sampled periodically, also as described above. After 30 minutes the percent of monoperoxide has increased to 18%. After heat treating 1¼ hours the percent of monoperoxide has increased to 22.2% while the amount of mixed bisperoxides has decreased approximately 16%.

EXAMPLE 4

This example illustrates the purification of the mixed bisperoxides described in Example 1 in an inert solvent at a relatively low temperature.

The same procedure as described in Example 3 is followed except the solution is heated at a temperature of 92–94° C. (below reflux). Sampling the solution indicates that after 11 hours all of the monoperoxide has been decomposed. The purified bisperoxides are recovered by stripping the heptane solvent under reduced pressure at a temperature below 94° C. The amount of purified product is only slightly less than the amount of bisperoxides in the crude material.

EXAMPLE 5

This example illustrates the purification of the mixed bisperoxides described in Example 1 at a relatively high temperature.

To 100 parts of boiling octane is added 50 parts of crude bisperoxides containing 5.4% monoperoxide. The resulting solution is brought to reflux and maintained at a temperature of about 114° C. Periodic sampling of the solution indicates that the monoperoxide has completely disappeared after one hour. The purified bisperoxides are recovered by stripping the octane solvent under reduced pressure and found to amount to a little less than the amount of bisperoxides in the crude material.

EXAMPLE 6

This example illustrates the purification of a mixture of $\alpha,\alpha'$-bis(tert.-amylperoxy) meta- and para-diisopropylbenzene in an inert solvent.

Following the general procedure described in Example 4, 24 parts of the crude mixed bisperoxides containing 8.1% of meta- and para-isopropenyl-$\alpha$-tert.-amylperoxyisopropyl benzene is added to approximately 17 parts of heptane. The resulting solution is then heated at a temperature of 98–99° C. (below reflux). The solution is sampled periodically as described in Example 4. After 3 hours only a trace of monoperoxide is detected and after 7.8 hours the monoperoxide has essentially completely disappeared. The purified bisperoxides are recovered by stripping the heptane solvent under reduced pressure at a temperature below 94° C. The amount of purified product is only slightly less than the amount of bisperoxides in the crude material.

EXAMPLE 7

This example illustrates the purification of a mixture of a,a'-bis(tert.-p-menthanyl) meta- and para-diisopropyl benzene in an inert solvent.

Following the general procedure described in Example 4, 12 parts of the crude bisperoxides containing approximately 8% monoperoxide contaminant is added to 16 parts of heptane, the resulting solution is then heated at a temperature of 99° C. (below reflux). The resulting solution is sampled periodically as described in Example 2. After 8 hours all of the monoperoxide has been decomposed. The purified bisperoxides are recovered by stripping the heptane solvent under reduced pressure at a temperature below 94° C. The amount of purified product is essentially the same as the amount of bisperoxides in the crude material treated.

EXAMPLE 8

This example illustrates the purification of the mixed bisperoxides described in Example 1 in a flow reactor at relatively high temperatures and short contact time.

Mixed crude bisperoxides are melted and maintained at 65° C. in a hold tank from which they are pumped through a heated line into the bottom of a vertical stainless steel reactor. The reactor has an inside diameter of 2 centimeters and is packed with 50 cc. of 3/16 inch glass beads. Just above the glass beads is an effluent drain to continuously remove the purified bisperoxides. There is a vapor space at the top of the reactor with a vent to a condenser so that the volatile materials formed during the purification can be removed. By maintaining the glass beads at a temperature of 118–120° C. and adjusting the flow of bisperoxide to 0.75 ml./min., the monoperoxide contaminant is completely removed with a loss of less than 3% of the bisperoxides.

What I claim and desire to protect by Letters Patent is:

1. The process of purifying a bis(tert.-alkylperoxyisopropyl) benzene contaminated with an isopropenyl-α-tert.-alkylperoxyisopropyl benzene which comprises heat-treating said contaminated compound at a temperature of from about 90° C. to about 120° C. for a period of time sufficient to decompose said isopropenyl-tert.-alkylperoxyisopropyl benzene.

2. The process of claim 1 wherein the bis(tert.-alkylperoxyisopropyl) benzene is a α,α-bis(tert.-butylperoxy) diisopropyl benzene and the isopropenyl-α-tert.-alkylperoxyisopropyl benzene is isopropenyl-α-tert.-butylperoxyisopropyl benzene.

3. The process of claim 1 wherein the bis(tert.-alkylperoxyisopropyl) benzene is an α,α'-bis(tert.-amylperoxy) diisopropyl benzene and the isopropenyl-α-tert.-alkylperoxyisopropyl benzene is isopropenyl-α-tert.-amylperoxyisopropyl benzene.

4. The process of claim 1 wherein the bis(tert.-alkylperoxyisopropyl) benzene is an α,α'-bis(tert.-p-methanylperoxy) diisopropyl benzene and the isopropenyl-α-tert.-p-methanylperoxyisopropyl benzene.

5. The process of claim 1 wherein said purification is conducted in an inert solvent.

6. The process of claim 1 wherein said heat treatment is conducted under reduced pressure.

7. The process of claim 1 wherein said purification is a continuous process.

No references cited.

BERNARD HELFIN, Primary Examiner

W. B. LONE, Assistant Examiner

PO-1050
(5/69)

UNITED STATES PATENT OFFICE
CERTIFICATE OF CORRECTION

Patent No. __U.S.P. 3,584,059__     Dated __June 8, 1971__

Inventor(s) __Frederick G. Schappell (Case 3)__

It is certified that error appears in the above-identified patent and that said Letters Patent are hereby corrected as shown below:

Col. 3, Line 69 of p.p.; Page 7, Line 10 of spec.
"Na"   -- should read -- "No"

Col. 6, Line 1 of p.p.; Claim 2, Line 2 of spec.
"$\alpha-\alpha$"   -- should read -- "$\alpha-\alpha'$"

Col. 6, Lines 12 to 13 of p.p.; Claim 4, Lines 3 to 4 of spec.

"isopropenyl-$\alpha$-tert.-alkylperoxyisopropyl benzene is" was deleted

Signed and sealed this 16th day of November 1971.

(SEAL)
Attest:

EDWARD M. FLETCHER, JR.              ROBERT GOTTSCHALK
Attesting Officer                    Acting Commissioner of Patents